Oct. 6, 1953        D. D. GROSVENOR        2,654,204
COTTON SPINDLE MOISTENING APPARATUS
Filed June 20, 1952        3 Sheets-Sheet 1
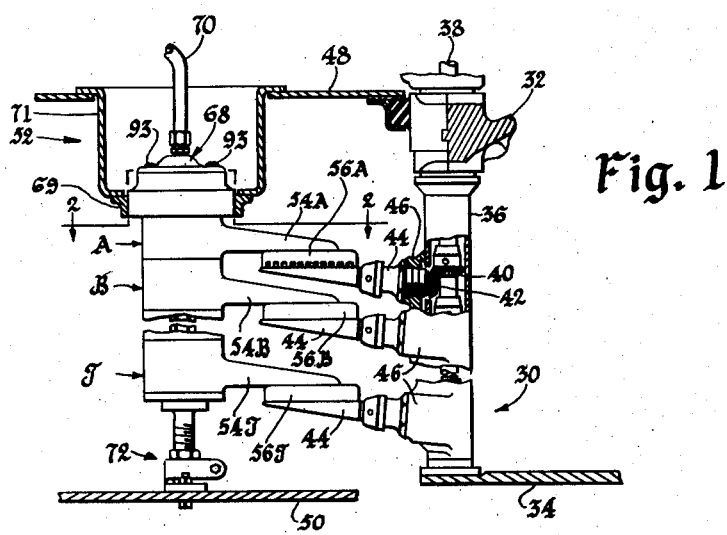
INVENTOR.
D.D. Grosvenor
BY
Attorneys

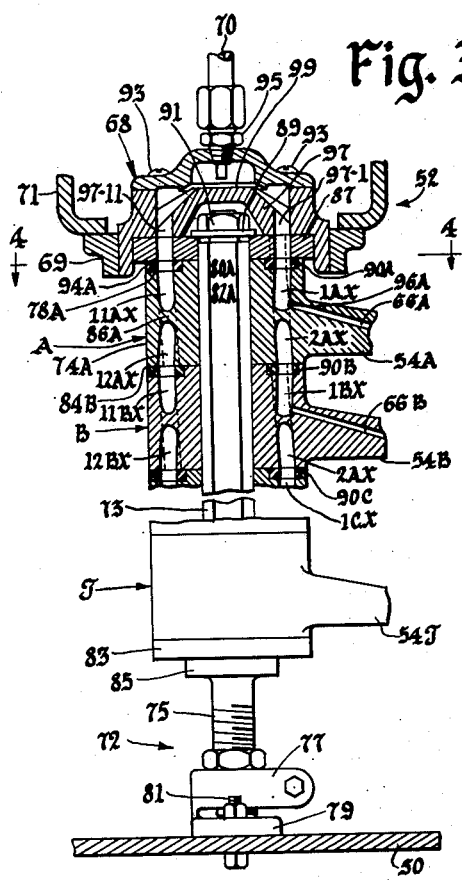
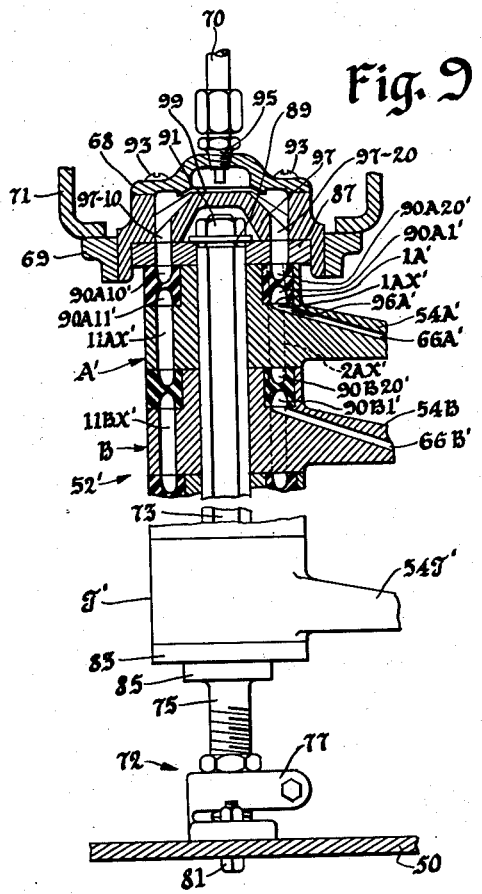
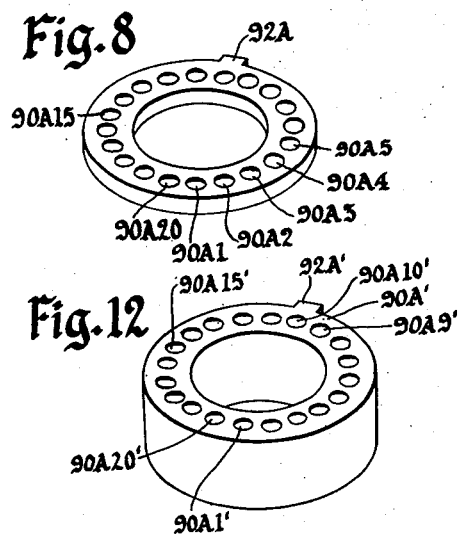
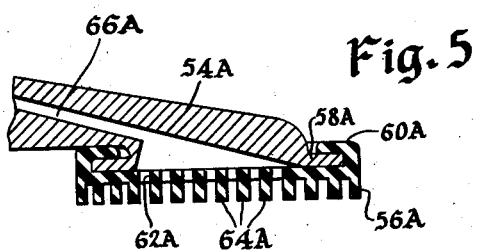

Oct. 6, 1953                D. D. GROSVENOR                2,654,204
                    COTTON SPINDLE MOISTENING APPARATUS
Filed June 20, 1952                                3 Sheets-Sheet 3

INVENTOR.
D. D. Grosvenor
BY
Attorneys

Patented Oct. 6, 1953

2,654,204

UNITED STATES PATENT OFFICE 2,654,204

COTTON SPINDLE MOISTENING APPARATUS

Dale D. Grosvenor, Ames, Iowa, assignor to Deere Manufacturing Co., Dubuque, Iowa, a corporation of Iowa Application June 20, 1952, Serial No. 294,689

26 Claims. (Cl. 56—41)

This invention relates to a fluid distributor and more particularly to such distributor for use in a cotton picker of the spindle type.

A typical cotton picker of the general character referred to is disclosed in the U. S. patent to Johnston, 2,140,631. Such machine will normally comprise a mobile carrying frame on which is supported one or more picking units. Each picking unit includes a rotatable drum having a plurality of circumferentially spaced columns from each of which projects a vertical series of picker spindles, the spindles being thus arranged in vertically spaced horizontal layers and each spindle being rotatable on its own axis in addition to being carried through a horizontal orbit because of rotation of the drum. In some instances, the spindles are barbed or otherwise roughened so as to implement their affinity for the cotton fibers. In other cases, the spindles may be relatively smooth. In either case, it is conventional to supply moisture in one form or another to the spindles prior to their entrance into the cotton plants. The addition of moisture to the spindles has been found to increase the picking capacity of the spindles, to minimize the accumulation on the spindles of plant juices and other foreign matter, and to facilitate doffing or wiping of the cotton from the spindles.

In one form of conventional picking machine heretofore known, the means for supplying moisture or fluid to the spindles comprises a vertical series of moistening pads, spaced apart on the order of the vertical spacing of the layers of spindles so that the spindles of each layer pass below and receive moisture from the associated pad. Fluid is supplied to the pads by a column-like device made up of a plurality of individual tubes terminally connected to the pads and having their other ends communicating with a header which is in turn connected to a source of fluid supply. Although an arrangement of the character just referred to is adequate from the standpoint of operating efficiency, the very nature of the construction presents serious manufacturing problems, since the individual tubes must be supported properly and must be separately connected to the moistening pads and to the header.

According to the present invention, the manufacturing problems are eliminated and the operating efficiency of the fluid distributor is increased by the provision of a distributor comprising a series of stacked identical elements arranged to form a column, each of the elements having therein a plurality of passages and the passages from one element to the next being correlated so that the upper element feeds directly to the upper feed pad, the next lower element feeds to the next lower pad and so on, all of the passages originating in the upper element, which has as many inlets as there are elements. It is a feature of the invention to provide these elements in the form of individual identical castings so that all may be manufactured from the same mold and so that the finishing or machining processes may be identical for each. In addition, the unitary or integral construction of each element enables the provision thereon of an integral branch for supporting the moistener pad. Consequently, the several soldering and brazing operations required in the prior art construction noted above are eliminated.

It is another feature of the invention to provide a series of identical elements, each of which has upper and lower surfaces, its upper surface being recessed to accommodate a gasket and the thickness of the gasket being slightly greater than the depth of the recess so that when the elements are assembled and drawn together by a compression member, the gasket is compressed between neighboring elements so as to establish a fluid seal against radial leakage. In this respect, the outer portion of the element forming the gasket recess is continuous and meets the bottom surface of the next higher element so as to prevent radial extrusion of the gasket as the elements are secured together.

A still further feature of the invention resides in the means for supporting the elements so that the elements are keyed together with their inlets and outlets respectively in register, the support means including a central member of non-circular section and the elements each having a central bore of correspondingly non-circular shape so that the elements are keyed to the support and thus held against relative angular displacement. A still further feature of the invention resides in the construction of the assembly of elements to form a column that may be readily used in pickers of existing types without materially altering the structure of such picker to adapt the novel distributor.

The foregoing and other important objects and desirable features inherent in and encompassed by the invention will become apparent as preferred embodiments of the invention are fully disclosed in the following detailed description and accompanying sheets of drawings in which Figure 1 is a fragmentary sectional view showing a typical cotton picker construction in which one form of the improved distributor is embodied.

Figure 2 is a transverse sectional view, on an enlarged scale, as seen substantially along the line 2—2 of Figure 1.

Figure 3 is a partial vertical sectional view as seen on the line 3—3 of Figure 2.

Figure 4 is a transverse sectional view, on the scale of Figure 2, as seen along the line 4—4 of Figure 3.

Figure 5 is a fragmentary sectional view on an enlarged scale as seen along the line 5—5 of Figure 4.

Figure 8 is a perspective view of the gasket member used with the element of Figure 7.

Figure 9 is a view similar to that appearing in Figure 3 but illustrating the use of a second form of distributor.

Figure 12 is a perspective view of the gasket used with the distributor element of Figure 11.

Figure 6:
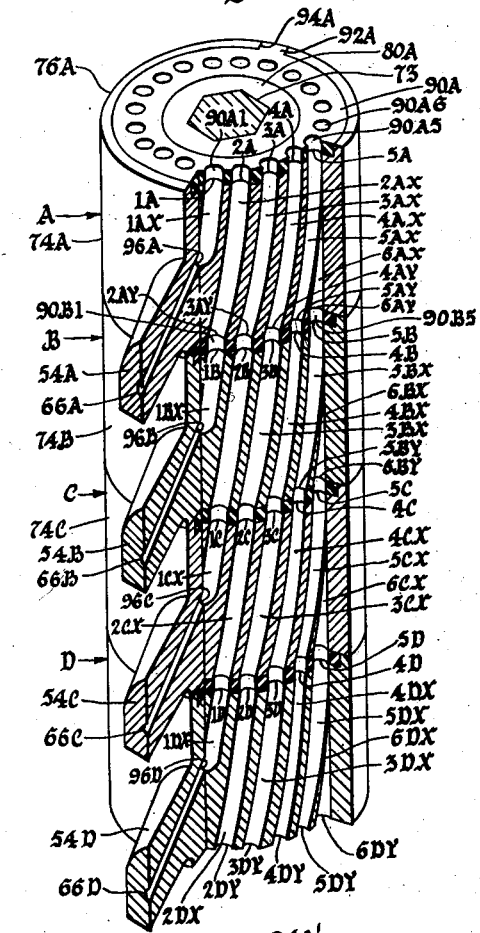
Figure 6 is a fragmentary perspective sectional view as seen along the line 6—6 of Figure 4.
Figure 10:
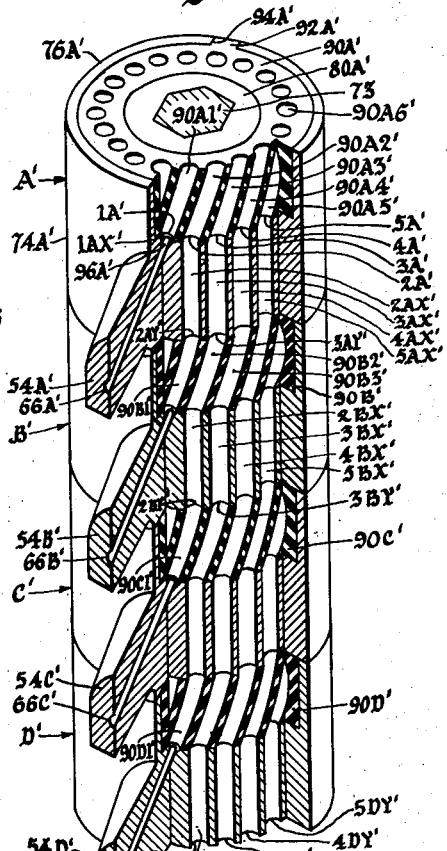
Figure 10 is a view similar to that appearing in Figure 6 but illustrating the second form of distributor.

In Figure 1, the numeral 30 designates generally cotton picking mechanism comprising a drum having an upper head 32 and a lower plate 34. This drum is rotatable about a central axis (not shown) and carries a plurality of picker bars or columns, only one of which appears at 36. A shaft 38 within the column 36 has thereon a plurality of bevel pinions, such as shown at 40, which are respectively in mesh with a plurality of spindle pinions 42, only one of which appears in Figure 1. Each pinion 42 is keyed to the shaft of a picker spindle 44, the column 36 having therein a plurality of uniformly vertically spaced spindle bearings 46 for supporting the several spindles. In one well-known construction, there are twenty vertically spaced spindles such as those shown at 44 in Figure 1. There may be any desired number of columns such as that shown at 36. These columns are arranged in uniformly circumferentially spaced relation about the drum and the spindles that project generally radially outwardly therefrom are thus arranged in horizontal vertically spaced layers. The first two spindles in Figure 1 represent the typical spacing between the first and second layers of spindles, it being understood that this spacing is uniform between the successive layers of spindles. The spindle at the bottom in Figure 1 is in the bottom layer and the intermediate layers have been omitted in the interests of avoiding unnecessary duplication of parts.

The housing in which the picker drum or mechanism 30 is carried comprises an upper plate 48 and a lower plate 50. These plates suitably support therebetween an upright distributor assembly designated generally by the numeral 52. This device or assembly will be described in detail below. For the present, a general explanation of the relationship between the distributor and the picking mechanism might be of interest.

The distributor in this case comprises a vertical series of identical elements equal in number to the layers of spindles 44. For the purposes of clarity in the later description, these elements will be designated by letters of the alphabet, beginning at A with the uppermost element. Since not all of the elements are shown, it will be understood that some of the intermediate designations will be necessarily omitted. The bottom or lowermost element is designated by the letter T. Each of the elements has integral therewith a fluid-distributing or delivering branch 54. Since these branches are identical, they will be designated by the numeral 54 followed by the designation of the element from which it extends. Each branch carries thereon a rubber moistener pad, the designations of the pads being such as to identify each pad with the element with which it is associated.

Figure 5 best shows the construction of the pad 56A and its relationship to the branch 54A. As shown, the branch has at its outer or free end a rectangular flange 58A, and the pad 56A has an elastic peripheral lip 60A which slips over the flange 58A and which is integral with a flat perforated portion 62A. The pad 56A has depending from the portion 62A a plurality of flexible fins 64A. The branch 54A has a passage 66A for conveying moisture to the perforations in the pad portion 62A, from which the moisture or fluid escapes via the fins 64A to the spindles in the layer over which the pad 56A is positioned, which is best shown in Figure 1. It will be understood, of course, that the remaining pads 56B, 56C, etc. are identical to the pad 56A. In the interests of clarity and brevity, detailed description of the remaining individual pads is deemed unnecessary. However, as shown in Figure 3, the branches 54A, 54B, etc. have passages 66B, 66C, etc. identical to the passage 66A.

The distributor 52 has a header 68 to which fluid of a suitable character is supplied by a supply pipe 70. By means that will be described below, the fluid reaches the distributor pads 56A, 56B, etc., for ultimate deposit on the associated spindles as the spindles pass respectively beneath the pads. The distributor 52 is supported in any suitable manner, as designated generally by the numeral 72 in Figure 1, for vertical adjustment relative to the upper and lower housing plates 48 and 50 so as to secure the proper relationship between the series of pads and the layers of spindles.

Figure 7:
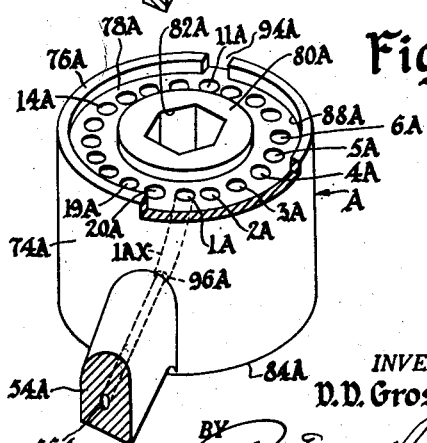
Figure 7 is a perspective view of one of the elements per se that make up the assembly shown in Figures 1 through 6, a portion of the peripheral wall of the element being broken away and the fluid-delivery branch being cut off to accommodate the figure to the sheet.

The following description will pertain to that form of the invention illustrated primarily in Figures 3 through 8 and immediate reference will be had to Figure 7.

In Figure 7, it will be assumed that the top or uppermost element A is shown. This element comprises a main body member 74A, which is preferably a casting of metal or other molded product of relatively rigid material. The branch 54A is rigid with the body 74A. It is preferred that the body and its branch be cast or molded integrally in order to render production of these items in quantity as economical as possible. The body 74A is generally of cup-shaped construction, to the extent that it has a peripheral wall 76A surrounding a top face or surface 78A, the rim of the peripheral wall 76A being, of course, spaced vertically above the surface 78A. The body has a central mounting portion 80A which rises from the surface 78A so that its upper portion is at a level in the vicinity of the level of the rim of the peripheral wall 76A. Preferably, the two portions referred to are coplanar. The mounting portion 80A has a central bore, preferably non-circular in shape as shown at 82A and adapted to receive a support as will appear presently.

The element A has a flat lower or undersurface 84A, and that portion of the body between the undersurface 84A and the top surface 78A defines a transverse wall 86A. It will be appreciated that in this form of the invention, the vertical dimension or thickness of the transverse wall 86A is preponderantly greater than the height of the peripheral wall 76A. It will be seen further that the projection of the mounting portion 80A above the top surface 78A creates at the top of the body member 74A an annular gasket-receiving space 88A, the bottom of which is formed, of course, by the top surface 78A. This annular recess receives a gasket member 90A (Figure 8) on which is formed a part in the form of a tab 92A adapted to be received by a slot 94A in the peripheral wall 78A. Thus, the parts 92A and 94A comprise interengageable parts cooperative to hold the gasket against angular movement relative to the body 74A.

As used herein, the expression "element" includes the body member 74A and the gasket 90A. It will be understood, of course, that the element could be of one-piece construction, but the present disclosure is based on one preferred embodiment of the invention and the detailed description should not be taken as importing any limitations into the invention. Similarly, such expressions as "top," "bottom," etc. are here used as terms of convenience and not of limitation. For example, cotton pickers are not unknown in which the drums rotate about axes other than vertical. Therefore, the expression "column" is also a term of convenience and not of limitation.

The body 74A has in a side portion thereof a discharge opening 96A which communicates with the fluid-delivery passage 66A in the element branch 54A. Thus, the opening 96A communicates via the passage 66A in a direction toward the picking mechanism. Consequently, the discharge opening 96A may be said to face toward the picking mechanism. The body member 74A is provided at its top surface 78A with a set of uniformly angularly spaced top openings numbered here from 1 to 20, beginning with number 1 just above and slightly angularly offset from the discharge opening 96A. Since reference is still being had to Figure 7, the openings for the element A are identified as 1A, 2A, etc. Corresponding openings that appear in other elements will also be numbered from 1 to 20 (to the extent that they are visible) and these numbers will have a suffix letter according to the element in which they are formed.

The opening 1A may be considered a feed opening and is connected by an individual passage 1AX to the discharge or side opening 96A. The body member 74A is provided with a plurality of additional passages equal in number to and leading respectively downwardly from the additional top openings 2A, 3A, etc., each of these passages being designated by the legend X as a suffix to the number of the top opening from which it leads. These are individual passages, being separate from the passage 1AX and separate from each other, and open at the lower surface 84A of the body member 74A as outlets 2AY, 3AY, etc.

In this embodiment of the invention, the elements A, B, etc. are circular (except for the branches). Therefore, the openings 1A, 2A, etc. are uniformly angularly spaced; although, it will be appreciated that they could be otherwise arranged within the spirit of the present invention.

Further, in this form of the invention, the outlet 2AY is directly under the feed opening 1A and the remaining outlets are uniformly angularly spaced according to the uniform angular spacing of the top openings 1A, 2A, etc. However, since the top opening 1A leads directly via the passage 1AX to the side or discharge opening 96A, there will be one fewer outlets 2AY, 3AY, etc. than there are top openings 1A, 2A, etc. Stated otherwise, excluding the top feed opening 1A, there are as many outlets as there are top openings. Since the outlet 2AY is directly below the top opening 1A, and since the angular spacing of the openings is uniform and equal to that of the angular spacing of the top openings, the circumferential or angular offset of the outlets relative to their respective top openings will be uniform around the member 74A. That is to say, the top openings 2A, which is the opening next adjacent to the feed opening 1A, is connected by the passage 2AX to the outlet 2AY, the passage 2AX being angled or offset relative to the vertical to accommodate the relationship just noted. It will be observed that in Figure 6 there is a definite spiral to each of the passages. As will be brought out below, this spiral is part of a helix of the entire columnar assembly 52. The helices on which the passages are respectively formed are uniform or identical throughout the column, which relationship establishes the peculiar communication of the passages to be outlined subsequently.

Since in this preferred embodiment of the invention the element A is of two-piece construction (including the body member 74A and the gasket 90A), the gasket is provided with a plurality of passages equal in number to the top openings in the body member 74A and angularly spaced according to the spacing of said top openings. For the purposes of identification, the passages in the gasket 90A are designated respectively by the numerals 1 through 20 suffixed to the basic gasket member number 90A.

Since it is quite apparent that the gasket 90A is flat and in the form of a ring to fit the annular recess 88A, it follows that the gasket has an upper surface and a bottom surface and that the bottom surface rests flatly on the top surface 78A of the body member 74A. In the interests of clarity, it is believed unnecessary to designate the inlets and outlets of the gasket member passages by separate legends. Suffice it to say that the gasket 90A fits in the gasket-receiving recess 88A of the body member 74A so that the gasket member passages 90A1, 90A2, etc. are respectively in register with the top openings 1A, 2A, etc. Proper register of the openings and passages is achieved by the cooperation between the tab 92A on the gasket and the slot 94A in the body member 74A.

It is a feature of the invention that the vertical dimension or thickness of the gasket 90A slightly exceeds the height to which the peripheral wall 76A rises above its surrounded top surface 78A. The gasket is of flexible material capable of compression vertically so that before assembly the upper surface of the gasket will be slightly above the level of the rim of the peripheral wall 78A. But, when the elements A, B, etc. are assembled and drawn together by a compression member to be subsequently described, the gaskets will be respectively compressed between neighboring elements so as to provide a fluid-tight seal preventing leakage in a direction radially of the column and preventing leakage among the various passages in the same element. As will best appear in Figure 3, the bottom surface of one element seats on the top of the rim of the peripheral wall of the body member of the next lower element. Since the peripheral wall of each body member surrounds its associated gasket, the gasket is prevented from being extruded through the joint between neighboring elements.

The elements are assembled axially onto a support member 73 which is here shown as being hexagonal in cross section, as is the shape of the bore 82A in the body member 74A. Likewise, the bore through each of the other elements is hexagonal. The main point to be observed is that the correspondingly similar non-circular shapes of the support and the bores through the elements are such as to achieve key means between the elements and the supports preventing angular displacement of one element relative to the other and thus maintaining registry of the associated passages.

The lower end portion of the support 73 is threaded at 75 to be received by a clamp 77 that forms part of the mounting means 72.

The clamp 77 has one or more ears 79 suitably secured, as by bolts 81, to the bottoms plate 50 of the housing. The outlets 1TY, 2TY, etc. of the bottom element T are closed in any appropriate manner, as by a circular plate 83 which rests on a collar 85 formed rigid with or otherwise secured to the lower end portion of the hexagonal support 73. The elements above the element T are stacked on the support 73 to form the column construction and a circular header plate 87, centrally apertured to receive the upper end of the support 73, rests on top of the element A. This header plate has twenty apertures therethrough (or any other number to correspond with the number of elements) and is secured in place as part of the column assembly by means of a washer 89 and nut 91 threaded onto a reduced threaded end portion of the support 73. The support 73 and its associated parts thus act as a draw member to secure the elements A, B, etc. together in compression, thus compressing the gaskets as stated above and providing for the fluid-tight seals as described. In the interests of clarity, the apertures through the header plate 87 will not be separately identified by reference characters.

The header means 62 previously described comprises an inverted cup secured by cap screws 93 to the header plate 87 and having an upper central aperture to receive a fitting 95 of the supply pipe 70. Within the header chamber thus provided is a conical fluted member 97 having a flat upper surface 99 directly below the supply tube 70. The conical portion of the member 97 is formed with a plurality of uniformly angularly spaced flutes leading outwardly and downwardly respectively to individual openings equal in number to the number of elements. These openings in the member 97 are designated in succession by the numerals 97-1 through 97-20 and these openings communicate through the respectively registering openings in the header plate 87 with the inlets to the element A as afforded by the gasket passages 90A1 through 90A20.

As best shown in Figure 1, the header means 68 is surrounded by a ring 69 that is carried by a cup-shaped apertured member 71 that is in turn secured to the upper housing wall 48. These details of the support means are not important and the distributor device 52 could be otherwise supported.

As will be apparent from the representative showing in Figure 6, the twenty inlets at the top of the top element A lead successively to the twenty vertically spaced moisture-applying pads 56A through 56T. The first pad is supplied directly with moisture via its branch passage 66A, side or discharge opening 96A, feed passage 1AX and the feed port as established by the registering top opening 1A in the member 74A and the first passage 90A1 in the gasket 90A. The next adjacent angled or spiraled passage 2AX in the element A has its outlet 2AY in register with the feed port of the element B, this feed port being established by the gasket member passage 90B1 and the member feed opening 1B and associated passage 1BX, which leads via the side opening 96B through the branch passage 66B to the pad 56B. Stated otherwise, the inlets of each element are successively and regularly offset with respect to the inlets of the element next above. The first inlet in each element leads directly to its discharge opening, the next inlet leads ultimately to the discharge opening of the element next below, the next inlet leads ultimately to the discharge opening of the second element below it and so on. The spiral or angular offset of the passages 1AX, 2AX, etc. provides for the arrangement of the discharge openings 96A, 96B, etc. in alinement along a line height-wise of or parallel to the axis of the columnar construction. Thus, the branches 54A, 54B, etc. may be in vertical alinement, as may be the pads 56A, 56B, etc.

Theoretically, each element need not have as many passages as the other. For example, the top element must have as many passages as there are elements, since it must ultimately supply all elements. However, the next to the top element may have one less passage than there are elements, since it must ultimately supply only itself and the elements below it. In short, each element need have only as many passages as there are elements below it, plus one. Thus, the bottom element need have only the passage 1TX for feeding directly to the discharge outlet 96T. However, in the interests of economy of manufacture, it is preferred that the elements be made identical, even though some of the passages are not used. Nevertheless, omission of the unnecessary passages while accomplishing the results as disclosed herein is not deemed to be a departure from the spirit of the invention.

To recapitulate: Each element—without regard to its specific identity—has three basic parts; to wit, the body, its integral branch, and its associated gasket. Each element has a plurality of passages X. One of the passages has a feed port 1 and the remaining passages have inlets 2, 3, etc. The passage that is connected to the feed port has its outlet through the side of the element at 96. And the remaining passages have outlets Y at the bottom of the element. Thus, there are one fewer outlets at the bottom of the element than there are inlets at the top of the element, considering the feed port as one of the inlets. However, considering the discharge opening as an outlet, the number of outlets equals the number of inlets.

In explanation of Figure 3, and having particular reference to the uppermost element A, it will be observed that the passages 1AX and 11AX appear to terminate in the midplane between the upper and lower surfaces of the elements, and yet appear to have continuations 2AX and 12AX, This result is due to the cutting of the element by a vertical plane for the purposes of the section on the line 3—3 in Figure 2. Thus, this plane cuts through the spiraling passages in such manner that only the upper half of the passage 1AX and the lower halves of the passages 2AX and 12AX appear in the sectional view. The passage 1AX of course terminates at the discharge opening 96A. If the passages were such that the center line of each was parallel to the axis of the column, then each passage lying in the plane of the section would be visible from top to bottom, but since the passages are spiral or angularly offset as described, a somewhat anomalous appearance results.

Another preferred form of the invention is disclosed in Figures 9 through 12. Various of the details of this embodiment of the invention are identical to those of the embodiment just described.

The following description will pertain to the embodiment shown in Figures 9 through 12. The distributing element is designated in its entirety by the numeral 52' and is supported between the upper and lower housing plates 48 and 50 in a manner identical to that described in connection with Figure 3. To the extent that the same parts are utilized in the mounting or support of the assembly 52, these parts will bear the same reference characters used in the description of Figure 3, without any additional detailed description.

Figure 11:
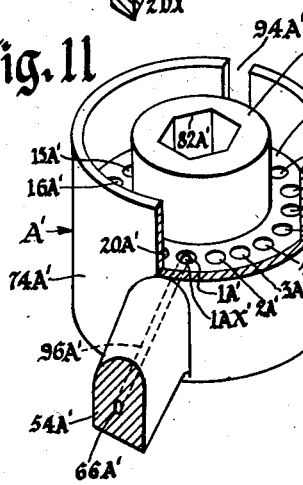
Figure 11 is a perspective view similar to Figure 7 but illustrating the second form of distributor element per se.

The basic difference between each of the elements may best be seen by a comparison of Figures 7 and 11. Again, to the extent that the two elements are similar, detailed description will not be resorted to, but reference characters corresponding to those previously used, but primed, will be applied to the drawing. One basic distinction between the elements 74A and 74A' is that in the latter the gasket-receiving annular recess 88A' is considerably deeper. Thus, the peripheral wall 76A' rises to a greater height above the top surface 78A'. Likewise, the supporting portion 80A' rises to a greater height above the surface 78A' than does the supporting portion 80A above the surface 78A of the element 74A. Nevertheless, the upper portions of the supporting portion 80A' and the peripheral wall 76A' are coplanar.

Another basic difference is that in the element A', for example, the passages 1AX', 2AX', etc. have their center lines parallel to the axis of the column so that the inlet 2A' of the passage 2AX' is in vertical alinement with the outlet 2AY' of said passage. However, in order to maintain the angular or spiral offset as outlined in connection with the description of Figures 1 through 8, the gasket 94A' is constructed so that the spiral or offset is incorporated therein in the passages 90A1', 90A2', etc. The gasket 90A' has thereon a tab 94A' which cooperates with a slot 96A' in the peripheral wall 76A' of the body member 74A'. Because of the considerably increased depth of the gasket-receiving annular recess 88', the gasket 90A' is correspondingly increased in thickness. Again, the gasket is, when not compressed, slightly greater in thickness or vertical dimension than the depth of the recess so that when the members 74A', 74B', etc. are assembled the gaskets may be compressed as previously described. Again, the peripheral wall 76A' surrounds the gasket 90A' so as to prevent radial extrusion of the gasket. The fluid-tight seal features of the modified form of the invention are the same as those of the form of the invention described above.

In all other respects, the two forms of the invention are substantially identical, with the exceptions noted above. Inasmuch as the gasket 90A', for example, is composed of flexible moldable material, it is found easier to mold or core the spiral passages in the gasket than it is in the cast metal of which the member 74A', for example, is composed. Nevertheless, the conditions of molding or casting may vary from time to time and it may be found easier to manufacture the modification of Figures 1 through 8. These distinctions are pointed out merely as differences between the two forms of the invention and not as limiting factors that may determine that one or the other may be insignificantly modified as a departure from the spirit of the invention.

Briefly, the fluid-distribution results attainable in the construction of Figures 8 through 12 are the same as those attainable in the modification of Figures 1 through 8. For example, looking now at Figure 10, the gasket member passage 90A1', which receives fluid from the header 68 via the conical member passage 97-1 leads to the feed port 1A' in the upper surface 78A' of the upper element. Because of the depth of the annular gasket-receiving recess 88A', the feed port 1A' and its associated passage 1AX' that leads to the discharge opening 96A' are substantially coincident. Nevertheless, their presence coincides with the presence of the corresponding openings and passage in the other form of the invention. Thus, the upper element conveys fluid directly to its own branch 54A'. The second gasket member passage 90A2' spirals downwardly and angularly to communicate with the passage 2AX' in the body member 74A'. The outlet 2AY' of this passage 2AX' is in communication with the spiraled passage 90B1' of the element B' and this passage leads to the branch passage 66B' in the branch 54B'. As in the instance previously described, the individual inlets in the top element lead ultimately and in succession to the vertically spaced and vertically alined branch passages 64A', 66B', etc.

As initially outlined, the present invention eliminates many of the manufacturing difficulties and expenses heretofore experienced. Inasmuch as each of the elements may be cast and the molds may be identical, there is little if any difficulty experienced in originally assembling or subsequently disassembling and reassembling the components of the distributor. Because of the key means afforded by the support of non-circular section and the bores of non-circular shape through the elements, it is necessary only to see that the branches are in vertical alinement, which, together with the keying or interlocking of the gaskets to their associated elements, assures perfect registry of the associated passages and openings.

Various features of the invention not specifically enumerated will undoubtedly occur to those versed in the art, as will other modifications of the preferred embodiments of the invention disclosed, all of which may be achieved without departing from the spirit and scope of the invention.

What is claimed is:

1. In a cotton picker having picking mechanism of the type including a plurality of uniformly vertically spaced layers of picker spindles, the improvement residing in a fluid distributor for the spindles comprising: a vertical series of individual distributor elements equal in number to the spindle layers and respectively having upper and lower surfaces and arranged to form a column alongside the picking mechanism, with the lower surface of each element except the bottom element overlying the upper surface of the next lower element and with said elements respectively at the levels of the spindle layers; each element having in a side portion thereof facing toward the picking mechanism a discharge opening leading toward the associated layer of spindles and a feed passage extending inwardly and upwardly and opening as a feed port at the upper surface of the element, the elements being so arranged that the feed ports are alined along the height of the column; each element above the bottom element having therein as many transfer passages as there are elements below it, one transfer passage in each element except the bottom element having an outlet at its lower surface in register with the feed port in the next lower element and an inlet at its upper surface offset from said outlet in a direction transverse to the height of the column so as to be transversely spaced from its own feed port, said one transfer passage being separate from its own feed passage and shaped to extend both transverse to and along the height of the column to provide said offset, the remaining transfer passages in each element being similarly shaped and having similarly offset inlets and outlets so that the inlets of the remaining transfer pasages in each element, with the exception of those in the top element, are progressively respectively in register with the outlets of the remaining transfer passages in the next higher element; and means above the top element for supplying fluid to the inlets and feed port of the top element, whereby said top element feed port delivers fluid via its feed passage directly to its discharge opening and the top element inlets deliver fluid via their own transfer passages and the successively registering passages below them to the remaining discharge openings in descending order.

2. The invention defined in claim 1, in which: each element has rigid therewith a single distributor branch projecting transversely outwardly therefrom toward the picking mechanism substantially at the level of the associated layer of spindles, said branch has a fluid delivery passage therein in communication with the associated discharge opening, and the branches are in vertical alinement.

3. The invention defined in claim 2, in which: each element includes a casting and its distributor branch is an integral cast part thereof.

4. The invention defined in claim 1, in which: each element is of rigid construction and incorporates therein the above defined passages, feed port and discharge opening and is further recessed at one of its surfaces to provide a gasket-receiving space; a gasket is positioned in each such space to cooperate with the associated surface of the neighboring element, each gasket having apertures therethrough to communicate the registering inlets, outlets and feed ports; and securing means running height-wise of the columns operates on the top and bottom elements to compress the intervening elements and the gaskets therebetween to unify the column.

5. The invention defined in claim 4, in which: the elements and their associated gaskets respectively have interlocking parts for assuring such positioning of the gaskets as to achieve registry of the gasket apertures with the associated inlets, outlets and feed ports.

6. The invention defined in claim 4, in which: the gasket-receiving space in each element is defined by a transverse surface surrounded by a peripheral wall extending vertically therefrom; the thickness of each gasket is slightly greater than the vertical dimension of the wall; and each gasket is compressible in a vertical direction so that the securing means draws the elements together with the gaskets compressed therebetween and with the rim of the peripheral wall of each element contacting the associated surface of the neighboring element.

7. The invention defined in claim 1, in which: a support member runs height-wise of the column to secure the elements together; and means is cooperative between said member and the elements to lock the elements in position to maintain the register of the associated inlets, outlets and feed ports.

8. The invention defined in claim 1, in which: each element comprises an outer cup-like member of relatively rigid material and an inner filler member of relatively flexible material; said outer member having a peripheral side wall and a transverse wall, said transverse wall having an outer face providing one of the substantially horizontal surfaces of the element and an interior face surrounded by the peripheral wall, said transverse wall further having apertures therein providing parts of the passages in the element; and said inner member is received within the outer member and is surrounded by the peripheral wall of said outer member, said inner member having first and second substantially horizontal faces, the first of which lies flatly against the interior face of the outer member transverse wall and the second of which provides the other substantially horizontal surface of the element; and said inner member has openings therethrough respectively in register with the apertures in the transverse wall and providing the other parts of the passages in the element.

9. The invention defined in claim 8, in which: the transverse wall is relatively thin and the inner member is relatively thick; and the apertures in the transverse wall are vertical and the openings through the inner member are shaped as aforesaid to provide the aforesaid offset between the inlets and outlets of the transfer passages.

10. In a cotton picker having picking mechanism of the type including a plurality of uniformly vertically spaced layers of picker spindles, the improvement residing in a fluid distributor for the spindles comprising: a vertical series of individual distributor elements equal in number to the spindle layers and respectively having upper and lower surfaces and arranged to form a column alongside the picking mechanism, with the lower surface of each element except the bottom element overlying the upper surface of the next lower element and with said elements respectively at the levels of the spindle layers; each element having in a side portion thereof facing toward the picking mechanism a discharge opening leading toward the associated layer of spindles and a feed passage extending inwardly and upwardly and opening as a feed port at the upper surface of the element, the elements being so arranged that the feed ports are radially spaced from the axis of the column and in alinement on a line parallel to the axis of the column; each element above the bottom element having therein as many transfer passages as there are elements below it, one transfer passage in each element except the bottom element having an outlet at its lower surface in register with the feed port in the next lower element and an inlet at its upper surface offset angularly from said outlet so as to be angularly spaced from its own feed port, said one transfer passage being separate from its own feed passage and shaped to extend both vertically and angularly to provide said offset, the remaining transfer passages in each element being similarly shaped and having similarly offset inlets and outlets so that the inlets of the remaining transfer passages in each element, with the exception of those in the top element, are uniformly angularly spaced about the axis of the column and progressively respectively in register with the outlets of the remaining transfer passages in the next higher element; and means above the top element for supplying fluid to the inlets and feed port of the top element, whereby said top element feed port delivers fluid via its feed passage directly to its discharge opening and the top element inlets deliver fluid via their own transfer passages and the successively registering passages below them to the remaining discharge openings in descending order.

11. The invention defined in claim 10, in which: each element has an axial opening therethrough separate from its passages, said openings are coaxial; a support member passes through the coaxial elements; and key means is cooperative between the support member and the elements for keying the elements to the support member against angular displacement of the elements relative to each other.

12. The invention defined in claim 11, in which: each axial opening is of non-circular shape and the support member is of correspondingly non-circular section to achieve the key means.

13. The invention defined in claim 10, in which: each element is circular about the axis of the column and has integral therewith a radially projecting branch leading toward the picking mechanism, said branch has a fluid delivery passage therein in communication with the associated discharge opening; and the branches are in vertical alinement.

14. The invention defined in claim 10, in which: each transfer passage is formed on a helix of the column axis to achieve the aforesaid angular offset between its inlet and outlet and the groups of communicating transfer passages from element to element are formed respectively on the same helices.

15. A fluid distributor of the character described, comprising: an elongated assembly in the form of a column made up of a series of identical elements that respectively have upper and lower surfaces disposed radially to the axis of the column, and means securing the elements together in surface-to-surface contact except for the upper surface of the top element and the lower surface of the bottom element; each element having at its upper surface a plurality of openings equal in number to the elements and uniformly angularly spaced on a circle about the column axis, one of said openings being a feed port and the other of said openings being inlets; each element having at its lower surface a plurality of openings equal in number to the inlets and providing outlets angularly spaced on an identical and concentric circle on the order of the spacing of the inlets so that one outlet lies directly below the feed port and the remaining outlets lie respectively directly below the inlets; each element having therein a feed passage communicating with the feed port and leading radially to the exterior of the element apart from the inlets and outlets in that element; each element further having a number of additional passages equal to the inlets in the element and separate from each other and from the feed passage and connected respectively to and leading both downwardly and angularly from the inlets toward the outlets in such manner that the first inlet next to the feed port in each element is connected to the outlet directly below said feed port and the remaining inlets in each element are connected respectively in succession to the remaining outlets; the elements being arranged so that the feed ports are alined on a line parallel to the column axis, each feed port except that in the top element registering with one outlet of the next higher element and the inlets in each element except the top element registering with the outlets of the next higher element; means closing the outlets in the bottom element; and means for supplying fluid to the inlets and feed port in the top element.

16. A distributor element of the character described, comprising: a body having a side portion and upper and lower surfaces; means in the body providing a discharge opening in the side portion; means in the body providing a set of spaced openings at the upper surface of the body, one of said openings being a feed port and the other openings being inlets; means in the body providing a feed passage connecting the feed port and the discharge opening; means in the body providing a set of openings comprising outlets at the lower surface of the body equal in number to the aforesaid inlets, one of said outlets lying directly below but separate from the feed port and the other outlets being spaced apart on the order of the spacing of the inlets so as to lie directly below the inlets; and means in the body providing a plurality of transfer passages separate from each other and from the feed passage and respectively connecting the inlets and outlets, one transfer passage leading from the inlet next adjacent to the feed port to an outlet and the remaining transfer passages leading in regular succession from the other inlets respectively to the other outlets.

17. The invention defined in claim 16, in which: a branch is rigid with the body and extends outwardly from the side portion; and said branch has a delivery passage therein leading from the discharge opening.

18. The invention defined in claim 16, in which: the body is of two-piece construction, divided intermediate its upper and lower surface into a lower part and an upper part, one of said parts being of relatively rigid material and the other part being of relatively flexible material and serving as a gasket; and one of said parts has one set of the aforesaid openings and the other part has the other set of openings to provide the feed port, inlets and outlets and the discharge opening; and at least one of said parts has portions of the passages therein to interconnect the openings as aforesaid.

19. A distributor element of the character described, comprising: a generally cup-shaped member having a transverse wall and a peripheral wall surrounding the transverse wall, said transverse wall having an exterior lower surface and an interior top surface within the peripheral wall, and said peripheral wall having a rim spaced above said top surface; means in the member providing a discharge opening leading outwardly intermediate the top and lower surfaces of the transverse wall; means in the member providing a plurality of spaced individual passages opening at the top surface of the transverse wall as a plurality of individual top openings, one of said top openings comprising a feed opening and one of the passages leading from said feed opening to the discharge opening and the other passages leading downwardly and opening at the lower surface of the transverse wall as a plurality of individual outlets; and a gasket member received within the peripheral wall and having a bottom surface lying flat on the top surface of the transverse wall and an upper surface in the vicinity of the rim of the peripheral wall, said gasket member being perforated to provide a plurality of spaced upright passages respectively having inlets at its upper surface and transfer openings at its lower surface, said transfer openings being respectively in register with the body member top openings.

20. The invention defined in claim 19, in which: the gasket member is composed of flexible material providing for vertical compression thereof; and the vertical dimension of the uncompressed gasket member slightly exceeds the vertical distance between the top surface of the transverse wall and the rim of the peripheral wall so that the upper surface of the gasket member when uncompressed is slightly above said rim but when compressed is at least flush with said rim.

21. The invention defined in claim 19, in which: the gasket and body members respectively have interengageable parts cooperative to position the gasket so as to assure register of the gasket member passages and the top openings in the transverse wall of the body member.

22. The invention defined in claim 19, in which: one of the outlets is directly below the feed openings; and said other passages are uniformly angled to the vertical so that the top opening next to the feed opening is connected to said one outlet and the remaining top openings are connected in regular succession respectively to the remaining outlets.

23. The invention defined in claim 19, in which: the passages in the gasket member have inlets at the upper surface of the gasket member and transfer openings at the bottom surface of the gasket member; and the gasket member passages are uniformly angled to the vertical so that each gasket member passage connects an inlet to the transfer opening below the next adjacent inlet.

24. The invention defined in claim 19, in which: the member includes a central support rising from the top surface of the transverse wall and surrounded by the peripheral wall; the top openings are in that portion of said top surface between the peripheral wall and the support portion; the support portion has a bore vertically therethrough and independent of the passages and openings and adapted to receive a support; and the gasket member is in the form of a ring surrounding the support portion and surrounded by the peripheral wall.

25. The invention defined in claim 24, in which: the bore is of non-circular shape and adapted to receive a support of correspondingly non-circular section.

26. A fluid distributor of the character described, comprising: an elongated assembly in the form of a column made up of a series of identical elements that respectively have upper and lower surfaces disposed transverse to the axis of the column, and means securing the elements together in surface-to-surface contact except for the upper surface of the top element and the lower surface of the bottom element; each element having at its upper surface a plurality of spaced openings equal in number to the elements, one of said openings being a feed port and the other of said openings being inlets; each element having at its lower surface a plurality of openings equal in number to the inlets and providing outlets spaced on the order of the spacing of the inlets; each element having therein a feed passage communicating with the feed port and leading transversely outwardly to the exterior of the element apart from the inlets and outlets in that element; each element further having a number of additional passages equal to the inlets in the element and separate from each other and from the feed passage and connected respectively to and leading downwardly from the inlets toward the outlets in such manner that the first inlet next to the feed port in each element is connected to one outlet and the remaining inlets in each element are connected respectively in succession to the remaining outlets; and the elements being arranged so that the feed ports are alined on a line parallel to the column axis, each feed port except that in the top element registering with one outlet of the next higher element and the inlets in each element except the top element registering with the outlets of the next higher element.

DALE D. GROSVENOR.

No references cited.